US012037060B2

(12) United States Patent
Tibori

(10) Patent No.: US 12,037,060 B2
(45) Date of Patent: Jul. 16, 2024

(54) METHOD FOR DIAGNOSING A FUNCTIONALITY USING DISCRETE VALUES OR DISCRETE CLASSES OF VALUES ON THE INPUT OR OUTPUT SIDE

(71) Applicants: thyssenkrupp Presta AG, Eschen (LI); thyssenkrupp AG, Essen (DE)

(72) Inventor: Tamás Tibold Tibori, Budapest (HU)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 968 days.

(21) Appl. No.: 16/979,914

(22) PCT Filed: Mar. 14, 2019

(86) PCT No.: PCT/EP2019/056368
§ 371 (c)(1),
(2) Date: Sep. 11, 2020

(87) PCT Pub. No.: WO2019/179860
PCT Pub. Date: Sep. 26, 2019

(65) Prior Publication Data
US 2021/0362778 A1 Nov. 25, 2021

(30) Foreign Application Priority Data
Mar. 22, 2018 (DE) ...................... 10 2018 106 871.9

(51) Int. Cl.
*B62D 5/00* (2006.01)
*B62D 5/04* (2006.01)
(Continued)

(52) U.S. Cl.
CPC ............. *B62D 5/0484* (2013.01); *B62D 5/00* (2013.01); *B62D 5/046* (2013.01); *B62D 5/0481* (2013.01);
(Continued)

(58) Field of Classification Search
CPC ........ B62D 5/0484; B62D 5/00; B62D 5/046; B62D 5/0481; B62D 5/0487;
(Continued)

(56) References Cited

U.S. PATENT DOCUMENTS 3,996,567 A 12/1976 Avsan
4,635,214 A 1/1987 Kasai et al.
(Continued)

FOREIGN PATENT DOCUMENTS

CN 101620442 A 1/2010
CN 104834303 A 8/2015
(Continued)

OTHER PUBLICATIONS

English Translation of International Search Report issued in PCT/EP2019/056368, dated May 15, 2019.

*Primary Examiner* — Tiffany P Young
(74) *Attorney, Agent, or Firm* — thyssenkrupp North America, LLC

(57) ABSTRACT

A method for diagnosing a functionality having an input or output signal with discrete values or discrete classes of values which are observable quantities of a diagnosis functionality. The signal to be diagnosed is the input or output signal, where the values or classes of values have a cardinality N, where N error counters are provided. The method includes providing a sum signal from the sum of the signals of the error counters. When a value or a class of values is erroneous, the method includes incrementing the signal of the error counter assigned to the erroneous value or the erroneous class. When the value or the class is correct, the method includes decrementing the signal of the error counter assigned to the value or the class and when the sum signal exceeds a pre-established limit value, the method includes outputting an error message of the functionality.

18 Claims, 1 Drawing Sheet

(51) Int. Cl.
  *G05B 19/042* (2006.01)
  *G07C 5/08* (2006.01)
(52) U.S. Cl.
  CPC ....... *B62D 5/0487* (2013.01); *G05B 19/0428* (2013.01); *G07C 5/0808* (2013.01); *G05B 2219/25257* (2013.01); *G05B 2219/2637* (2013.01)
(58) Field of Classification Search
  CPC ...... G05B 19/0428; G05B 2219/25257; G05B 2219/2637; G07C 5/0808
  USPC .......................................................... 701/41
  See application file for complete search history.

(56) References Cited

U.S. PATENT DOCUMENTS

| | | |
|---|---|---|
| 8,898,364 B2 | 11/2014 | Kuschke |
| 2006/0130496 A1 | 6/2006 | Chapman et al. |
| 2006/0293831 A1 | 12/2006 | Yano |
| 2009/0327821 A1 | 12/2009 | Bauerle et al. |
| 2010/0211711 A1 | 8/2010 | Kuschke et al. |
| 2011/0060855 A1 | 3/2011 | Kuschke et al. |
| 2011/0163708 A1 | 7/2011 | Mukai |
| 2014/0156144 A1* | 6/2014 | Hoshi ................ H02P 29/0241 318/400.15 |
| 2016/0264173 A1 | 9/2016 | Goto |
| 2017/0328953 A1 | 11/2017 | D'angelo |
| 2018/0047534 A1 | 2/2018 | Zhao |
| 2019/0146034 A1 | 5/2019 | D'angelo |
| 2020/0209310 A1 | 7/2020 | D'angelo |

FOREIGN PATENT DOCUMENTS

| | | | |
|---|---|---|---|
| CN | 105899419 A | 8/2016 | |
| CN | 206515693 U | 9/2017 | |
| CN | 107390664 A | 11/2017 | |
| DE | 10 2006 028 695 A | 2/2007 | |
| DE | 10 2011 000 024 A | 9/2011 | |
| EP | 0 708 233 A | 4/1996 | |
| EP | 2 874 065 A2 | 5/2015 | |
| ES | 415010 A1 | 2/1976 | |
| JP | S60-11907 A | 1/1985 | |
| JP | H11-184762 A | 7/1999 | |
| WO | WO-2017080942 A1 * | 5/2017 | ............ F02D 41/22 |

* cited by examiner

METHOD FOR DIAGNOSING A FUNCTIONALITY USING DISCRETE VALUES OR DISCRETE CLASSES OF VALUES ON THE INPUT OR OUTPUT SIDE

CROSS REFERENCE TO RELATED APPLICATIONS

This application is a U.S. National Stage Entry of International Patent Application Serial Number PCT/EP2019/056368, filed Mar. 14, 2019, which claims priority to German Patent Application No. DE 10 2018 106 871.9, filed Mar. 22, 2018, the entire contents of both of which are incorporated herein by reference.

FIELD

The present disclosure generally relates to a method for diagnosing a functionality.

BACKGROUND

In applications relevant to safety and software implementations of diagnosis functions in the automobile sector, errors can arise while the vehicle is in operation. Measures are thus necessary in order to detect errors and to react appropriately to errors detected. In the case of electric motors used in motor vehicle steering systems, the amount of time provided for the detection of an error has tended to be very small. A faulty electric motor will therefore also switch off in the presence of unstable signals which indicate no critical error. This behavior is unwanted.

Thus, a need exists to put forward an improved and above all stable method for diagnosing a functionality.

DETAILED DESCRIPTION

Figure 1:
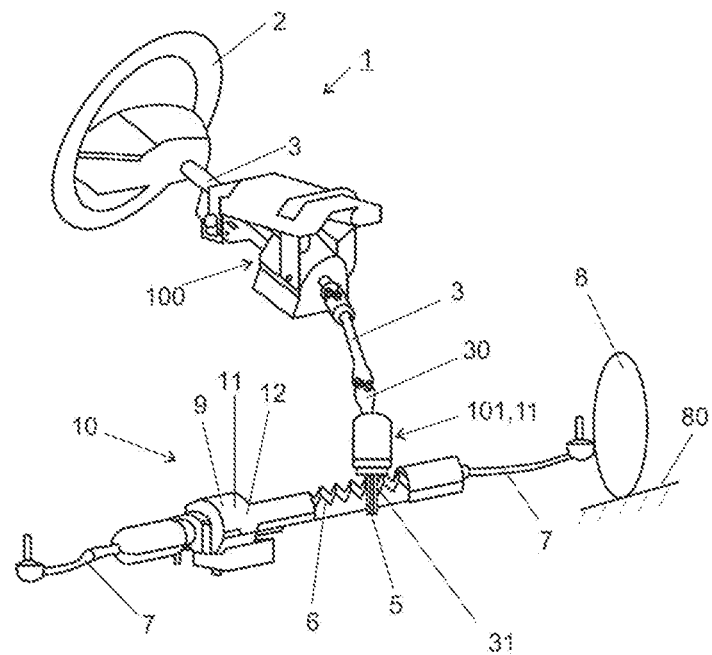
FIG. 1 is a schematic view of an electromechanical motor vehicle servo steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure concerns a method for diagnosing a functionality, a safety switching device for a motor with a diagnosis functionality which is set up to carry out the method, and an electromechanical motor vehicle steering system and a steer-by-wire steering system for a motor vehicle with a servo motor which has such a safety switching device.

Accordingly, there is provision for a method for diagnosing a functionality which has an input or output signal with discrete values or discrete classes of values which are observable quantities of a diagnosis functionality, where the signal to be diagnosed is the input or output signal and where the values or the classes of values have a cardinality N, and N error counters are provided. The method comprises the following steps:
  providing a sum signal from the sum of the signals of the error counters;
  if a value or a class of values is erroneous, incrementing the signal of the error counter assigned to the erroneous value or the erroneous class;
  if the value or the class is correct, decrementing the signal of the error counter assigned to the value or class;
  if the sum signal exceeds a pre-established limit value, outputting an error message of the functionality.

The method renders the functionality able to manage an unstable input or output signal. The detection of errors is stable for transient errors. A stability of the functionality is achieved by allowing a certain number of erroneous values of the relevant signal or the classes before the functionality is regarded as erroneous.

Here, the error detection time for consistently false values or classes of values is equivalent to the error detection time of a trivial diagnosis application, the cardinality of which is 1, with an error detection based on the occurrence of a single error.

Preferably, the distribution of the input values or input classes is not concordant with the distribution of the values of the output signal or the output classes.

The classes are preferably so defined that input values or output values on which a function of the functionality has the same effect are grouped into a class.

Preferably, the incrementing and/or decrementing of the signal takes place continuously over time, in particular linearly.

Provision can alternatively be made for the signal of the error counter to be set directly to zero should a correct value be encountered.

The number of values or classes of values is preferably small and in particular the cardinality is less than 4.

In a preferred embodiment, the functionality comprises a safety switching device of a motor, where preferably the signal to be diagnosed is the output signal of the safety switching device.

Advantageously the safety switching device inspects an angular velocity of the motor and prevents a switching element in a control loop of the motor from opening at an angular velocity above a permissible limit value or from closing at an angular velocity below a permissible limit value. Here the cardinality is preferably two and the value reproduces an exceeding of or falling short of the permissible limit value. If the probability density function of the input values is positive over the whole range of values, a systematic error has a limited probability of being detected, even if the error occurs only for rare combinations of input values.

The following further steps can be provided:
  measuring the angular velocity and inspecting the value of the output signal of the safety switching device;
  if the value of the output signal is erroneous, incrementing the signal of the error counter assigned to the erroneous value;

if the value is correct, decrementing the signal of the error counter assigned to the value.

The switching element is preferably a relay or a MOSFET. It can be part of one or more inverters and/or operated by one or more control devices.

It is preferred that a main controller and an additional microcontroller which measure the angular velocity independently of each other are provided in the control loop of the motor, where in particular the main controller inspects the additional microcontroller as part of the safety switching device.

There is also provided a safety switching device for a motor with a diagnosis functionality, where the diagnosis functionality is set up to carry out the method described above.

Furthermore an electromechanical motor vehicle steering system and a steer-by-wire steering system for a motor vehicle with a servo motor having such a safety switching device are provided.

In FIG. 1 an electromechanical motor vehicle servo steering system 1 is represented schematically, with a steering wheel 2 which is coupled in a non-rotatable way to an upper steering shaft 3. The driver introduces an appropriate torque into the steering shaft 3 via the steering wheel 2 as a steering command. The torque is then transferred to a steering pinion 5 via the upper steering shaft 3 and lower steering shaft 4. The pinion 5 meshes in familiar fashion with a tooth segment of a toothed rack 6. The toothed rack 6 is mounted in a steering system housing so as to be moveable in the direction of its longitudinal axis. At its free end the toothed rack 6 is connected to track rods 7 via ball joints, which are not represented. The track rods 7 themselves are each connected in familiar fashion to a steered wheel 8 of the motor vehicle via steering knuckles. A rotating of the steering wheel 2 leads via the combination of the steering shaft 3 and the pinion 5 to a longitudinal displacement of the toothed rack 6 and hence to a pivoting of the steered wheels 8. The steered wheels 8 experience via a road 80 a retroactive effect which works against the steering movement. To pivot the wheels 8 a force is therefore required which necessitates a corresponding torque at the steering wheel 2. An electric motor 9 of a servo unit 10 is provided in order to assist the driver in this steering movement.

The upper steering shaft 3 and the lower steering shaft 4 are coupled together in a rotationally elastic way via a spindle, not shown. A torque sensor unit 11 captures the twisting of the upper steering shaft 3 relative to the lower steering shaft 4 as a measure of the torque exerted manually at the steering shaft 3 or the steering wheel 2. Depending on the torque 111 measured by the torque sensor unit 11, the servo unit 10 provides steering assistance for the driver. Here, the servo unit 10 can be coupled either to a steering shaft 3, the steering pinion 5 or the toothed rack 6 as an auxiliary power assistance device 10, 100, 101. The respective auxiliary power assistance 10, 100, 101 carries an auxiliary power moment into the steering shaft 3, the steering pinion 5 and/or into the toothed rack 6, by which the driver is assisted in the steering work. The three different auxiliary power assistance devices 10, 100, 101 represented in FIG. 1 show alternative positions for their arrangement. Usually only a single one of the positions shown is occupied by an auxiliary power assistance. The servo unit 10 has an electronic control unit 12 for calculating the steering assistance. The electric motor 9 has a number of phase windings at its disposal. The phase windings of the electric motor are controlled by the control unit 12. At least one switching element is assigned to each of the phase windings. An electronic switch is preferably provided as switching element, usually an electronic switch made from a semiconductor material. The choice of an appropriate semiconductor component arises from the desired switching behavior. The semiconductor components used are preferably MOSFETs; however, with higher voltages of >50 volts, other components, IBGTs for example, can be employed. In the control loop, the control of the electric motor 9 can be governed by the measured angular velocity. The angular velocity can be measured by an RPS sensor for example.

A safety switching device is provided which inspects the angular velocity of the motor and prevents a switching element in the control loop from opening at too high an angular velocity and thereby sustaining damage. In addition, a diagnosis functionality is provided for detecting a malfunction of the safety switching device. The safety switching device is designed so as not to open the switching element if the diagnosis functionality detects a malfunction.

An additional microcontroller is integrated in the control loop of the switching element which measures the angular velocity of the motor independently of a main controller and delays a request to open the switching element until safe opening of the switching element can be carried out. The additional microcontroller is monitored as part of the diagnosis functionality by the main controller. The main controller measures the angular velocity of the motor and receives a 1 bit piece of information of the additional microcontroller as to whether the angular velocity of the motor is above or below a limit value for the safe opening of the switching element. It is desirable that the functionality is as stable as possible, that is to say that only latent errors are detected. For this case, in which the output value of the additional microcontroller has a small cardinality with only two values, 'above' and 'below', and the condition under normal circumstances is 'below', it is particularly important to take into account all erroneous 'below' values in the diagnosis functionality.

The diagnosis functionality is designed to 'debounce' the signal. That means that an unstable and thus error-containing signal of the additional microcontroller is indeed detected, but it does not lead to the detection of an error in the safety switching device until a certain number of errors are present or a systematic error arises.

Figure 2:
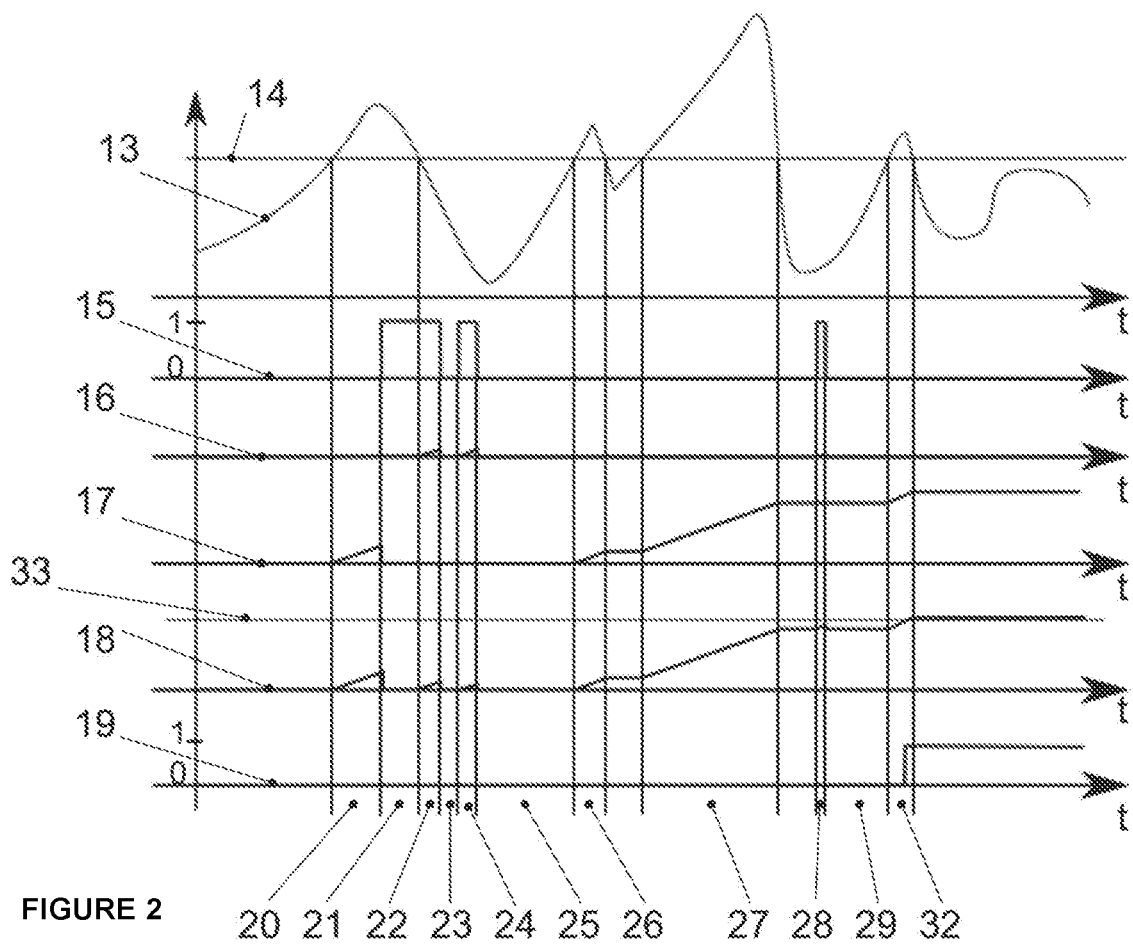
FIG. 2 is a time series for an angular velocity of a motor of the electromechanical motor vehicle servo steering system with error detection for a safety switching device.

In FIG. 2 examples of signal time series are represented for a safety switching device with diagnosis functionality. The switching element may be a relay or MOSFET, which are operated by one or more control devices. The switching element is part of one or more inverters. FIG. 2 shows, seen from top to bottom, in a first line the actual angular velocity 13 of the motor 9 plotted against time. A permissible limit value for the opening of the switching element is entered as threshold value 14. In the second line the output signal of the additional microcontroller 15 is represented. The microcontroller outputs the values 1 and zero, where the value is equal to 1 if the angular velocity exceeds the permissible limit value. The output signal of the additional microcontroller is inspected as part of the diagnosis functionality. Two error counters are provided, the signal 16, 17 of which is represented in lines three and four. Since the main controller measures the angular velocity independently of the additional microcontroller, the first error counter detects an erroneously output value of the microcontroller if the angular velocity is below the limit value 14 and the additional microcontroller outputs the value 1. The second error counter on the other hand detects an erroneously output value of the microcontroller if the angular velocity is above the limit value 14 and the microcontroller outputs the value zero. When an error is detected by the error counters, these are incremented continuously. If the microcontroller outputs correct values again, the error counters are reset to zero. The sixth line shows the sum of the output signals 18 of the signals of the error counters 16, 17. The output signal of the diagnosis functionality 19 is represented in the last line. The output signal is zero if no error is present and one if an error was detected. Only when an error is detected is the safety switching device affected by error and the switching element will no longer open.

In what follows, the time series of the angular velocity shown in FIG. 2 and the reactions of the safety switching device with diagnosis functionality are described.

The angular velocity rises in an initial range 20 until it is above the permissible limit value 14. The additional microcontroller does not detect the exceeding of the limit value 14 and regards the signal of the angular velocity as permissible. The diagnosis functionality detects the error of the additional microcontroller and the second error counter is incremented. The presence of an error is not detected, however, and the sum signal of the diagnosis functionality remains zero.

The angular velocity remains above the permissible limit value 14 in a second range 21 of the time series. The microcontroller detects the exceeding and correctly outputs the value 1. The second error counter is therefore reset to zero. Later on, in a third range 22, the angular velocity drops below the limit value. The additional microcontroller does not detect the change and continues to erroneously output the value 1. The first error counter is therefore incremented. After the microprocessor outputs the correct value again (range 23), the first error counter is reset to zero. In what follows, a transient error of the additional microprocessor occurs in a further range 24, which is detected by the first error counter. After that, the first error counter is reset to zero (range 25). After a while the additional microprocessor has a permanent error; it no longer indicates the presence of an excessively high angular velocity. This is not detected by the diagnosis functionality until the angular velocity exceeds the permissible limit value 14. In this case, the second error counter is incremented (range 26). Since the microprocessor no longer outputs a correct output signal at all when the permissible limit value is exceeded, the signal of the second error counter is no longer reset to zero and, in the time whenever the angular velocity exceeds the permissible limit value, is incremented more and more (ranges 27, 32). Towards the end of the time series, a short transient error arises in the output signal of the microprocessor (range 28). This is detected by the first error counter, the signal of which is incremented accordingly. After the microprocessor no longer shows this error (range 29), the first error counter is reset to zero. After a while, a pre-established limit value in the sum signal of the error counters, also termed 'debounce limit' 33, is exceeded, which triggers the detection of an error of the safety switching device and prevents the opening of the switching element for safety reasons.

The incrementing of the error counters takes place continuously when a corresponding error occurs. Preferably, the signal of the error counters increases linearly with time.

The invention is not limited to electromechanical steering systems. There may for example also be provision for use in electric motors of steer-by-wire steering systems.

What is claimed is:

1. A method for diagnosing a functionality which has an input or output signal with discrete values or discrete classes of values which are observable quantities of a diagnosis functionality, where the signal to be diagnosed is the input or output signal and where the values or the classes of values have a cardinality N, wherein N error counters are provided, comprising:
    providing a sum signal from the sum of the signals of the error counters;
    when a value or class of values is erroneous, incrementing the signal of the error counter assigned to the erroneous value or the erroneous class;
    when the value or the class is correct, decrementing the signal of the error counter assigned to the value or the class; and
    when the sum signal exceeds a pre-established limit value, outputting an error message of the functionality, and wherein a main controller and an additional microcontroller which measure angular velocity independently of each other are provided in a control loop of the motor and wherein the additional microcontroller delays a request to open the switching element until safe opening of the switching element can be carried out.

2. The method of claim 1 wherein the distribution of the input values or input classes is not concordant with the distribution of the values of the output signal or output classes.

3. The method as claimed in claim 1 wherein input values or output values on which a function of the functionality has the same effect are grouped into a class.

4. The method of claim 1 wherein the incrementing and/or decrementing of the signal of the error counter takes place continuously over time.

5. The method of claim 4 wherein the incrementing and/or decrementing of the signal of the error counter takes place linearly.

6. The method of claim 4 wherein the signal of the error counter is decremented directly to zero.

7. The method of claim 1 wherein the functionality comprises a safety switching device of a motor.

8. The method of claim 7 wherein the signal to be diagnosed is the output signal of the safety switching device.

9. The method of claim 8 wherein the cardinality is at least two and the value reproduces an exceeding of the permissible limit value.

10. The method of claim 8 further comprising:
    measuring the angular velocity and inspecting the value of the output signal of the safety switching device;
    when the value of the output signal is erroneous, incrementing the signal of the error counter assigned to the erroneous value; and
    when the value is correct, decrementing the signal of the error counter assigned to the value.

11. The method of claim 8 wherein the switching element is a relay or MOSFET.

12. The method of claim 8 wherein the switching element is part of one or more inverters.

13. The method of claim 8 wherein the switching element is operated by one or more control devices.

14. The method of claim 7 wherein the safety switching device inspects an angular velocity of the motor and prevents a switching element in the control loop of the motor from switching at an angular velocity which exceeds the permissible limit value.

15. A safety switching device for a motor with a diagnosis functionality which is set up to carry out the method of claim 1.

16. An electromechanical motor vehicle steering system with a servo motor having the safety switching device of claim 15.

17. A steer-by-wire steering system for a motor vehicle with a servo motor having the safety switching device of claim 15.

18. The method of claim 1, wherein the additional microcontroller is monitored as part of the diagnosis functionality by the main controller.

* * * * *